United States Patent [19]

Denton et al.

[11] 4,266,113

[45] May 5, 1981

[54] DISMOUNTABLE INDUCTIVELY-COUPLED PLASMA TORCH APPARATUS

[75] Inventors: Medona B. Denton, Tucson, Ariz.; David L. Windsor, Cincinnati, Ohio; David R. Heine, Tucson, Ariz.

[73] Assignee: The United States of America as represented by the Secretary of the Navy, Washington, D.C.

[21] Appl. No.: 54,048

[22] Filed: Jul. 2, 1979

[51] Int. Cl.³ .............................................. B23K 9/00
[52] U.S. Cl. ..................... 219/121 PQ; 219/121 PM; 219/121 PN; 219/121 P; 313/231.3
[58] Field of Search ................ 219/121 P, 121 R, 74, 219/76.16, 75; 313/231.3, 231.4, 231.5

[56] References Cited

U.S. PATENT DOCUMENTS

| | | | |
|---|---|---|---|
| Re. 29,304 | 7/1977 | Greenfield et al. | 219/121 P |
| 3,296,410 | 1/1967 | Hedger | 219/121 P |
| 3,471,675 | 10/1969 | Sargent et al. | 219/75 |
| 3,892,882 | 7/1975 | Guest et al. | 219/121 P |
| 4,035,604 | 7/1977 | Meleka et al. | 219/121 P |

FOREIGN PATENT DOCUMENTS

| | | | |
|---|---|---|---|
| 2505665 | 8/1976 | Fed. Rep. of Germany | 219/121 P |
| 1149473 | 4/1969 | United Kingdom | 219/121 P |

Primary Examiner—Elliot Goldberg
Assistant Examiner—M. Paschall
Attorney, Agent, or Firm—Richard S. Sciascia; Thomas M. Phillips

[57] ABSTRACT

Precise concentric alignment of the coolant, plasma and sample gas tubes used in conventional ICPs is an operationally important factor often achieved by fused arrangements which effectively preclude dismountability for maintenance and repair. Spacer rings slip-fitted into the coolant and plasma passages provide support for the concentric arrangement and also permit dismountability. Each ring is slotted to direct coolant and plasma gases and improve their intended functions. One ring spans the plasma tube and has a number of vertically-directed peripheral slots producing a laminar plasma gas flow. The other ring spans the coolant passage and has a pair of threads cut at spaced intervals to spiral the coolant gas and improve its heat transfer function. A separable base member supports the concentric lower ends of the tubes.

8 Claims, 6 Drawing Figures

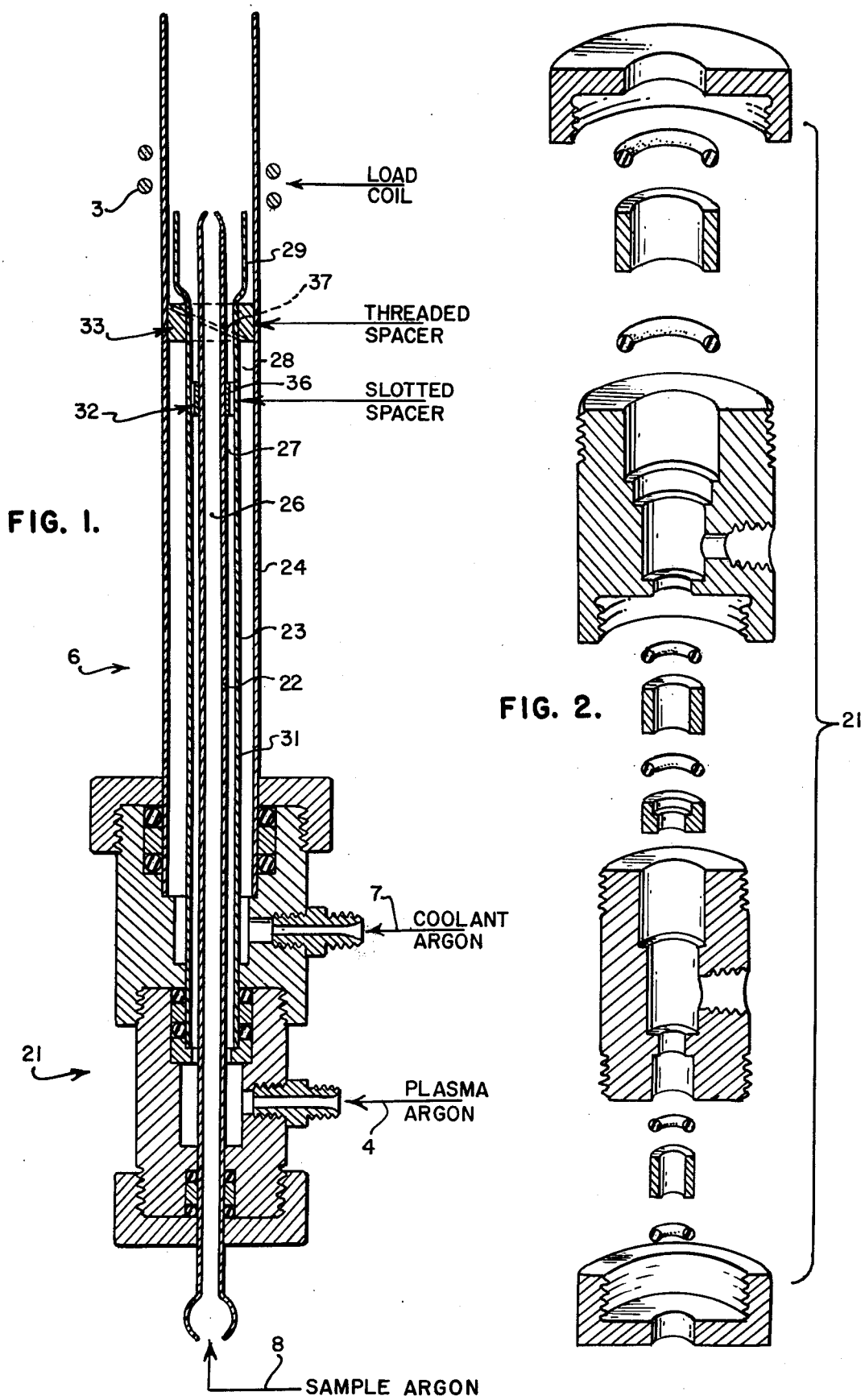

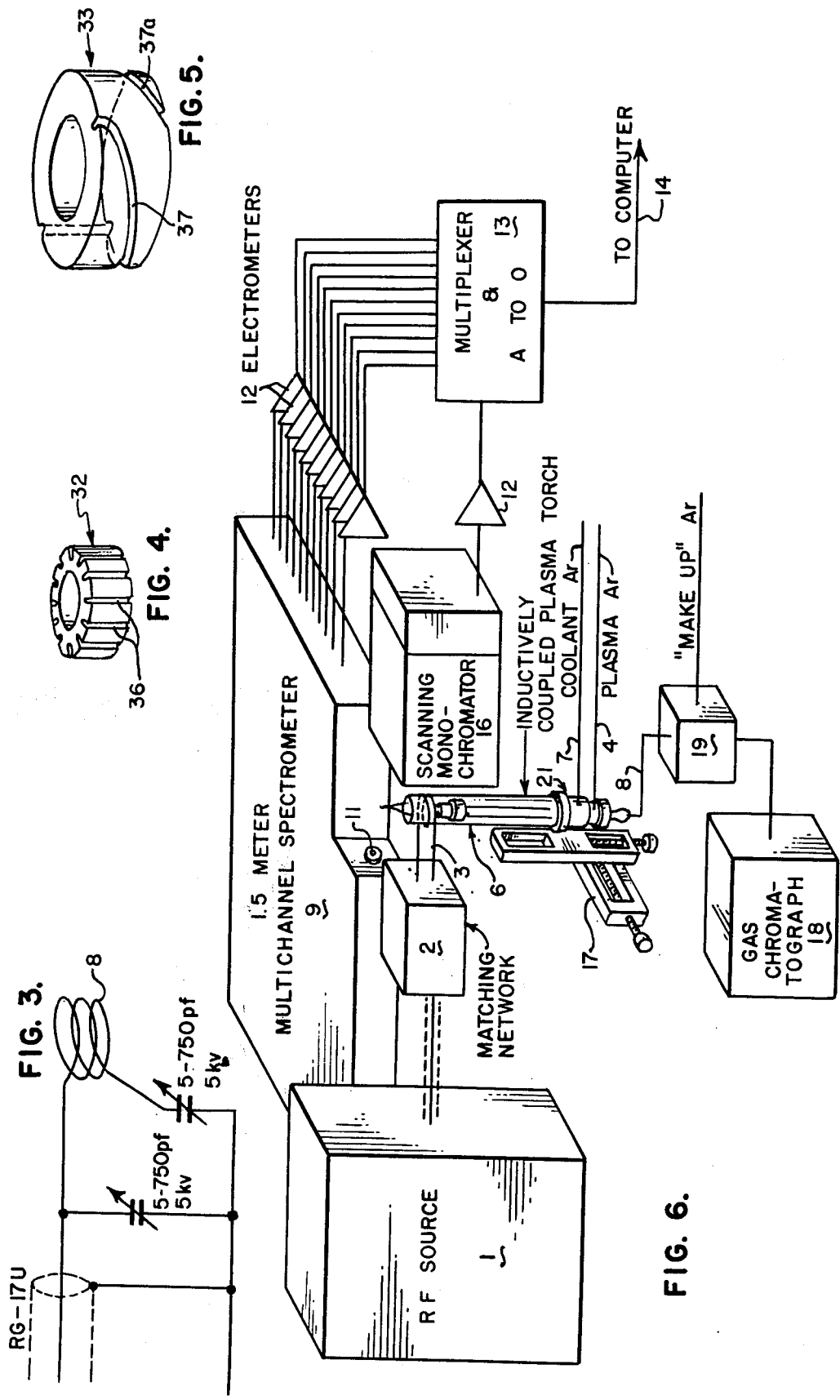

DISMOUNTABLE INDUCTIVELY-COUPLED PLASMA TORCH APPARATUS

BACKGROUND OF THE INVENTION

The present invention relates to inductively-coupled plasma torches and, in particular, to torch designs that improve performance and facilitate maintenance.

The relative ease of operation, power capability and overall performance of an inductively-coupled plasma torch (ICP) depends upon a number of factors not the least important of which is the torch design itself. In general, most ICPs include three concentric silica and/or Pyrex tubes usually referred to as an inner sample tube, a 'flared' plasma gas tube and an outer coolant tube. Conventionally, these tubes either are fused into one- or two-piece units through glass blowing techniques or they have their lower ends mounted in some demountable base assembly.

With regard to the glass-blown torch, precise concentric alignment, of course, can be achieved during construction through the use of an assembly jig. However, as will be recognized, a fused torch is not dismountable and therefore not easily repaired or maintained. As to repairs, conventional ICP torches, due to their limited heat transfer capabilities, are known to have rather restricted operational lives due to rather frequent meltdowns of the coolant tubes. When they occur, the fused arrangements have no capability for removing and replacing only the coolant tube itself.

The dismountable base approach also presents some difficulties in that the three tubes which are supported only by the base are difficult to align and to maintain in precise alignment. This problem is aggravated by the fact that commercial quartz and Pyrex glass tubing rarely is perfectly straight or cylindrical.

As already indicated, coolant tube melt-downs all too frequent are due mostly to their limited heat transfer capability. Improved gas flow patterns clearly can improve the heat transfer and reduce the melt-downs. Further, to the extent of the improvement, operation of the ICP also can be measurably improved since higher powers and longer coolant tubes can be used. The longer coolant tubes are beneficial since their additional length helps to shield the discharge and avoid entrainment of external gases such as environmental oxygen and nitrogen.

An object of the present invention is therefore to provide a demountable ICP arrangement in which concentricity of the coolant, plasma and sample tubes is securely maintained. Another object is to improve the gas pattern of the ICPs.

In brief, the objects of the invention are achieved by mounting the lower ends of the concentric tubes in a dismountable base assembly and supporting the upper ends by means of slip-fitted spacer rings. One ring which spans the plasma tube is slotted to produce a laminar plasma gas flow. Another ring spanning the coolant passageway is formed with spiral threads significantly increasing the tangential flow velocity of the coolant gas and improving its heat transfer capability.

BRIEF DESCRIPTION OF THE DRAWINGS

The present invention is illustrated in the accompanying drawings of which:

FIG. 1 is a somewhat schematic sectional view of the present plasma torch;

FIG. 2 is a view showing exploded sections of the components forming a dismountable base assembly for the torch;

FIG. 3 is an impedance matching network for use with the present torch;

FIGS. 4 and 5 are perspectives of the spacer rings, and

FIG. 6 is a block diagram illustrating the use of the present torch in a particular optical detection system.

DETAILED DESCRIPTION OF THE INVENTION

Before describing the ICP torch itself, it may be helpful to consider its conventional use. For this purpose, the optical detection system of FIG. 6 will be used although this system actually is one developed for special purposes described and claimed in a copending patent application filed July 2, 1979 by M. Bonner Denton and David L. Windsor and, presently identified Ser. No. 53,664. A brief functional description subsequently will be provided. For the present, the system components simply will be identified mostly to illustrate conventional ICP operations.

Referring to FIG. 6, a radio frequency (RF) power source 1 having, for example, a frequency of 2 to 30 MHz and power of 1 KW is coupled through capacitative matching network 2 to load coil 3 which may be two turns of about 5 mm O.D. copper tubing. The coil inductively energizes plasma gas, such as argon, supplied through a line 4 to a plasma torch 6 which, as may be seen, also is supplied through lines 7 and 8 with coolant argon and sample argon composed of the sample to be analyzed and an argon carrier gas. In a manner known to the art and described in a number of publications, application of the RF power through the coil produces a high temperature plasma region in the torch into which the sample is fed and in which it is excited to emit radiation. An optical spectrometer, such as multichannel spectrometer 9 has an entrance slit 11 monitoring the emissions and producing low level currents amplified by some means, such as FET electrometers 12, to produce voltage signals for a multiplexer 13 and a computer 14. In the illustrated system, a scanning monochrometer 16 also can be used. Simpler systems may use a strip recorder or the like for the readout. A device such as motor-driven slide members 17 can be used to adjust the vertical position of the torch relative to the optics although these components, as well as the optics, form no part of the invention and are mentioned only for background purposes. The samples to be analyzed can be eluted from a gas chromatograph 18 or otherwise injected into the torch through a comparable heater block or the like. To control the sample concentration, it is mixed with a carrier gas supplied into a splitter 19 as 'make-up' argon.

Plasma torch 6 is shown in detail in FIGS. 1–5 and its structure and arrangement provide the principal features of the present invention. In general, it includes a dismountable base assembly 21 supporting concentrically-disposed tubes identified as a sample tube 22, a plasma tube 23 and a coolant tube 24. The concentric arrangement, which is conventional, provides passageways 26, 27 and 28 into which respectively, sample, plasma and coolant gases are delivered. Base 21 formed of brass and shown in an exploded form in FIG. 2 should be readily understandable. Since these details are not of present interest, no part-by-part description is considered necessary. Suffice it to say that the base supports the bottom ends of the tubes and holds them in their desired concentric arrangement. As is apparent, the base readily can be broken-down to permit the tubes or the base members to be repaired, cleaned and otherwise maintained. The tubes also can be removed when the base is assembled.

Outer coolant tube 24 can be formed of quartz tubing about 25 cm length of 20 mm O.D. and 18 mm I.D. Middle plasma tube 23 also is quartz tubing having an upper mouth portion 29 flared outwardly. Lower portion 31 is cylindrical. Dimensionally, flare 29 is a 2 cm length of 15 mm O.D. 13 mm I.D. while lower portion 31 is 23 cm length of 11 mm O.D. 9 mm I.D. Inner sample tube is Pyrex tubing of 30 cm length and 7 mm O.D. 4 mm I.D. and, as shown, its upper end is constricted to 1.5 mm. A 15/5 ball joint is provided at its lower end. The tops of the sample and plasma tubes are flush and the center of the load coil is positioned 10 mm above the top of the sample tube. The coolant tube normally extends about 5 cm above the load coil. However, because of the improved heat transfer capability of the present coolant flow, the coolant tube can be made longer (about 25–30 cm) and can extend from 5–10 cm above the coil.

The present improvements primarily result from the use of special spacer rings 32 and 33. As shown, ring 32 which fits between lower portion 31 of plasma tube 23 and sample tube 22, is a disc-like member spanning plasma passageway 27. Similarly, ring 33 spans coolant passageway 28 fitting between plasma tube 23 and coolant tube 24. Thus, both rings maintain the concentricity at the upper end of the torch arrangement and assure that the passageway for both the coolant and plasma are perfectly straight. Concentricity therefore is assured by both the base support and the spacer rings. Both rings, which may be nylon or teflon, are slip fitted into their supporting dispositions to have only a frictional engagement permitting separation of the tubes one from another. This aspect provides the desired dismountability.

The rings also provide improved flow patterns both for the plasma or auxiliary gas and the coolant gas. Thus, as best seen in FIG. 4, ring 32 is formed with twelve vertical slots 36 provided in its peripheral wall, the slots each being 14 mm wide by 1.2 mm deep. These slots achieve a laminar plasma gas flow which significantly helps to stabilize the plasma. Prior art ICPs have had some difficulties with maintaining a stable plasma. Although the specific slotted arrangement of FIG. 4 is preferred, it is obvious that other arrangements can be substituted providing the desired laminar flow is produced.

Ring 33 also is a slotted member as shown in FIG. 5. Specifically, the slots are in the form of two threads 37 and 37a each of which is cut into the peripheral wall using, for example, a 60° "V" tool. Importantly, the two cuts are offset one from another 180°, i.e. their entrance and exit parts are 180° apart. The cuts themselves are of 1.57 thread/cm (4 threads/in) and 2.5 mm deep. The purpose of the threads is to increase the tangential flow velocity of the coolant through the high temperature region of the torch and thus improve the coolant's heat transfer capability. In other words, the coolant flow spirals into contacts with the coolant tube surfaces permitting a significantly improved heat transfer capability. In practice, melt downs of the coolant tubes are significantly minimized. Also, because of the improved heat transfer, higher powers can be used for the ICP as well as longer coolant tubes. The longer tubes can extend upwardly about 10 cm or more from load coil 3, and, as noted, advantageously shield the ICP and minimize entrainment of exterior gases. Data obtained using the present torch for the analysis of carbon and hydrogen in samples from a gas chromatograph have shown that the longer coolant tubes increase the absolute precision more than two fold.

With regard to high power ICPs, FIG. 3 shows an impedance matching network capable of matching the output impedance of a high power RF supply to the input impedance of the load coil. The capacitors of FIG. 3 are vacuum variable (Jennings Radio, UCSL 750) able to withstand 5000 V, and range from 5–750 pf. The circuit is constructed from 4.7 mm O.D., 3.24 mm I.D. copper tubing which can carry cooling water during operation. It readily operates in excess of 5 KW forward power with less than 50 W of reflected power. At forward power levels near 2 kw, the reflected power is less than 5 W.

The features of the present invention should be clear from the foregoing discussion. To repeat, they principally involve the improved plasma and coolant flow characteristics, the demountability and the precise maintenance of the concentric alignment.

As a matter of interest, this torch has been used in the ICP-OES systems show in FIG. 6. Functionally, this system has been sucessfully used for the simultaneous multi-element analysis of organic compounds and it also has a demonstrated capability for producing data from which both empirical and molecular formulas of unknown organic compounds can be derived. As noted, these operations are described in the previously-identified copending patent application. One aspect, however, is its ability to completely degrade or atomize molecular samples into their particular atomic species. The present torch because of its high power capability and its high temperature plasma achieves this complete degradation. In particular, the improved heat transfer of the torch permits the use of high power. Also, the use of the longer coolant tubes contribute to the precision of the analyses.

Obviously many modifications and variations of the present invention are possible in the light of the above teachings. It is therefore to be understood that within the scope of the appended claims the invention may be practiced otherwise than as specifically described.

We claim:

1. Inductively coupled plasma torch apparatus formed with elongate tubes providing concentric coolant, plasma and sample gas passageways comprising:
   a coolant tube,
   a plasma tube disposed concentrically within the coolant tube,
   a sample tube disposed concentrically within said plasma tube,
   a base detachably supporting the lower ends of said tubes in their concentric arrangement, and
   disc-like spacer rings disposed at the upper ends of said tubes in frictional engagement with the tube walls, said rings including:
   a first ring spanning the radial space between said coolant and plasma tubes, and
   a second ring spanning the radial space between the plasma and sample tubes,
   said first ring being provided with slanted channel means directing the coolant tube gas flow in a spiraling flow pattern for improving its heat transfer capability and said second ring with transverse channel means producing a laminar plasma gas flow pattern, and said frictional engagement of said rings maintaining the upper end concentricity of said tubes while permitting them to be dismountably separated one from another.

2. The apparatus of claim 1 wherein said channel means includes a threaded groove formed on the outer-peripheral surface of said first ring.

3. The apparatus of claim 2 wherein said slanted means is provided by a plurality of threaded grooves having spaced entrance and exit ports.

4. The apparatus of claim 3 wherein said thread spacing is symmetric; i.e. for two grooves the spacing is 180°.

5. The apparatus of claim 4 wherein each of rings is formed of a low-friction plastic slip-fitted into engagement with their tube walls.

6. The apparatus of claim 1 further including:
load coil means for applying power to said torch,
said plasma tube having a radially-flared upper end portion with said first ring being disposed closely below said flare,
said load coil being wound about said coolant tube above said flared portion, and
said coolant tube having its length projected upwardly from said coil a substantial distance greater than that normally used for conventional torches.

7. The apparatus of claim 6 wherein said sample tube is a capillary tube having its upper end disposed approximately radially adjacent to the upper end of said flared portion.

8. The apparatus of claim 6 wherein said coolant and plasma tubes are formed of quartz and said sample tube of Pyrex.

* * * * *